(12) United States Patent
Naveh et al.

(10) Patent No.: US 8,315,894 B2
(45) Date of Patent: Nov. 20, 2012

(54) WORKFORCE MANAGEMENT USING CONSTRAINT PROGRAMMING WITH EFFICIENT ORDERING OF VARIABLES

(75) Inventors: Yehuda Naveh, Haifa (IL); Yossi Richter, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 1050 days.

(21) Appl. No.: 12/198,131

(22) Filed: Aug. 26, 2008

(65) Prior Publication Data
US 2010/0057518 A1   Mar. 4, 2010

(51) Int. Cl.
*G06Q 10/00*   (2012.01)
(52) U.S. Cl. ........................... 705/7.11; 705/7.12
(58) Field of Classification Search .............. 705/7.11, 705/7.12
See application file for complete search history.

(56) References Cited

U.S. PATENT DOCUMENTS

| | | | | |
|---|---|---|---|---|
| 7,171,393 B2 * | 1/2007 | Naveh | ............. | 706/19 |
| 7,266,534 B2 * | 9/2007 | Emek et al. | ............. | 706/45 |
| 7,333,968 B2 * | 2/2008 | Geller et al. | ............. | 706/46 |
| 7,653,520 B2 * | 1/2010 | De Moura et al. | ......... | 703/2 |
| 2007/0027739 A1 * | 2/2007 | Connors et al. | ............. | 705/9 |

OTHER PUBLICATIONS

"Workforce optimization: Identification and assignment of professional workers using constraint programming" by Y. Naveh Y. Richter YD. L. Gresh D. P. Connors, IBM J. Res. & Dev. vol. 51 No. 3/4 May/Jul. 2007 p. 263.*

"Optimatch: Applying Constraint Programming to Workforce Management of Highly-skilled Employees", by Yossi Richter*, Yehuda Naveh*, Donna L. Gresht and, Daniel P. Connors in Proceedings of Service Operations and Logistics, and Informatics, 2007. SOLI 2007. IEEE International Conference on Aug. 27-29, 2007.*

"Constraint-Based Random Stimuli Generation for Hardware Verification" by Yehuda Naveh, Michal Rimon, Itai Jaeger, Yoav Katz, Michael Vinov, Eitan Marcus, and Gil Shurek in Al Magazine vol. 28 No. 3 (2007).*

* cited by examiner

*Primary Examiner* — Mark A Fleischer
(74) *Attorney, Agent, or Firm* — Daniel Kligler

(57) ABSTRACT

A method for resource management includes associating respective variables with resource consumers, and identifying resources as values applicable to the variables. A group of the variables are identified as preferred variables. An assignment of the values to the variables that satisfies constraints applying to the allocation of the resources is found by repeatedly performing the steps of choosing a variable from the group, instantiating the chosen variable with a value, removing the chosen variable from the group, and pruning the domains of the other variables by propagation of the constraints. The resources are assigned to the resource consumers responsively to the assignment of the values to the variables.

7 Claims, 2 Drawing Sheets

WORKFORCE MANAGEMENT USING CONSTRAINT PROGRAMMING WITH EFFICIENT ORDERING OF VARIABLES

BACKGROUND

The present invention relates generally to constraint programming, and specifically to efficient solution of constraint satisfaction problems.

Many of the tasks that are addressed by decision-making systems and artificial intelligence can be framed as constraint satisfaction problems (CSPs). In this framework, the task is specified in terms of a set of variables, each of which can assume values in a given domain, and a set of predicates, or constraints, that the variables are expected to satisfy. The set of variables and constraints is sometimes referred to as a constraint network. Each constraint may be expressed as a relation, defined over some subset of the variables, denoting valid combinations of their values. A solution to the problem is an assignment of a value to each variable from its domain that satisfies all the constraints. Methods of constraint programming are directed to modeling and solving CSPs.

BRIEF SUMMARY

An embodiment of the present invention provides a computer-implemented method for resource management. A set of resource consumers, resources for allocation to the resource consumers, and constraints applying to the allocation of the resources are defined. Respective variables are associated with the resource consumers, and the resources are identified as values applicable to the variables, thereby defining respective domains of the values for the variables. A group of the variables are identified as preferred variables. An assignment of the values to the variables that satisfies the constraints is found by repeatedly performing, while the group contains one or more of the variables, a number of steps. These steps include choosing a variable from the group, instantiating the chosen variable with a value, removing the chosen variable from the group, and pruning the domains of the other variables by propagation of the constraints responsively to the value of the chosen variable. The resources are assigned to the resource consumers responsively to the assignment of the values to the variables.

Other embodiments provide apparatus and a computer software product that operate on similar principles.

The present invention will be more fully understood from the following detailed description of the embodiments thereof, taken together with the drawings in which:

BRIEF DESCRIPTION OF THE SEVERAL VIEW OF THE DRAWINGS

DETAILED DESCRIPTION

Overview

Figure 1:
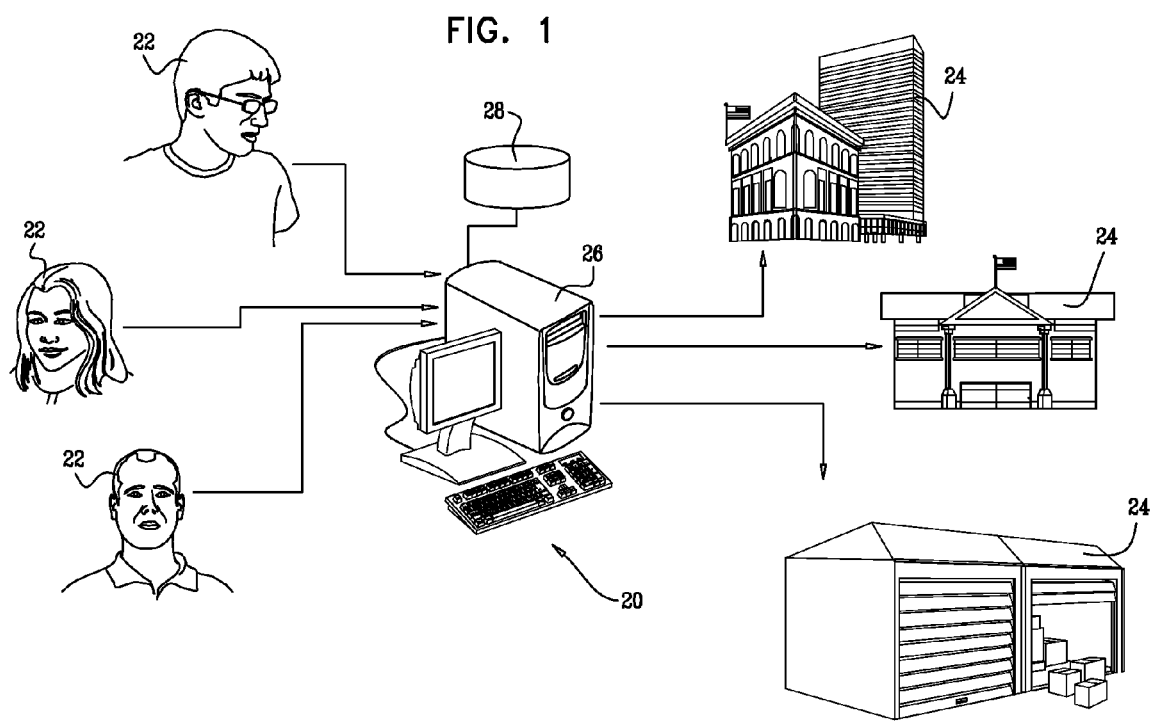
FIG. 1 is a schematic, pictorial illustration showing a system for workforce management, in accordance with an embodiment of the present invention.

Constraint satisfaction methods have been found useful in a variety of applications, including:

Artificial intelligence
Robotic control
Temporal reasoning
Natural language parsing
Spatial reasoning
Test generation for software and hardware systems
Machine vision
Medical diagnosis
Resource allocation
Crew scheduling
Time tabling
Frequency allocation
Graph coloring.

The embodiments described hereinbelow relate, by way of example, to problems of resource allocation, and specifically to workforce management, i.e., assigning skilled workers (resources) to tasks (resource consumers). The principles of the present invention, however, may similarly be used in other applications of constraint programming, such as test generation and design verification.

A CSP is formulated mathematically as a triplet (V,D,C), wherein V is a set of variables that characterize the problem to be solved, D are the respective domains of the variables (i.e., the values that each variable may assume), and C is a set of constraints, each defined over a subset of the variables. A solution to a CSP is an assignment of a respective value to each variable that satisfies all of the constraints. CSP solvers, as are known in the art, receive and solve CSP definitions that include the variables, domains and constraints, and return a solution. Some CSP solvers also accept "soft constraints," which the solution should desirably satisfy but are not strictly required. These soft constraints may be prioritized so that the CSP solver gives preference to solutions that satisfy high-priority constraints, even if one or more low-priority soft constraints are not satisfied.

In the case of workforce management, for example, each task to be accomplished is defined as a variable, with a domain containing the workers who may be assigned to perform each task. The constraints specify limitations on factors such as timing, location, cost and skill sets needed for the tasks. A solution to the CSP in this case typically assigns the workers so that all tasks are accomplished within the required time frame while matching worker skills to task demands and holding down the overall cost to the employer.

Systematic CSP solvers search for solutions over the entire problem space, which is defined by the Cartesian product of the variable domains. These solvers use constraint propagation to prune the search space, by filtering unsupported values from the domains of variables on which a given constraint acts. For example, assuming a certain constraint applies to the values of variables $V_1$ and $V_2$ together, and a certain value is assigned to $V_1$, the applicable constraint propagator routine will prune out the unsupported values from the domain of $V_2$, i.e., the values that are incompatible with the constraint given the assigned value of $V_1$.

Given an appropriate set of propagators for the constraints in a CSP, a systematic CSP solving algorithm typically works in stages. Each successive stage begins with a partial assignment of values to variables from the previous stage (or, at the first stage, from the initial domain definition) that is consistent, i.e., it does not violate any constraint. In each stage, two phases are applied: (1) In the instantiation phase, a trial value is assigned to one of the unassigned variables (i.e., a variable to which no specific value has yet been assigned) from its available domain. (2) In the propagation phase, the constraint propagators are used to prune out values of other variables that are now unsupported in view of the instantiated value.

Pruning the domain of a given variable in this stage due to one constraint may lead, by constraint propagation, to pruning the domains of other variables that are connected to the given variable by other constraints.

This procedure continues in stages until all variables are instantiated with values that satisfy the CSP, or until it is found that no satisfying assignment exists. In the course of the procedure, however, it often occurs at some stage that after instantiating a given variable to a certain value, the domain of another variable becomes empty as the result of constraint propagation. It is then necessary to backtrack through the search, wherein the variable domains are reset to their previous values, a new value is assigned to some variable, and the constraint propagation is repeated. (Sometimes it is necessary to backtrack and repeat several stages.) CSP solvers that are known in the art offer additional subroutines and heuristics that can be used to enhance the efficiency and flexibility of constraint propagation and pruning, but these aspects of CSP solving are beyond the scope of the present invention. One CSP solver that may be used in this context is the Choco constraint programming system, which is available on the Sourceforge.net® Web site.

It often happens that after a CSP has been solved and corresponding assignments have been made, conditions affecting the solution change. For example, after workers have been assigned to tasks over some future period, new tasks may be added, or certain tasks or employees may be eliminated, or constraints may be changed. Under these circumstances, a new solution must be found to the CSP. It is generally desirable that this new solution be as close as possible to the previous solution, so that, in terms of the present example, only a minimal number of the workers must change their task assignments. At the same time, it is desirable that the new solution be close to the optimum given the new conditions.

Embodiments of the present invention that are described hereinbelow address this sort of situation by using variable ordering and value ordering in the instantiation phase of the CSP solution process. At each stage of the process, variable ordering defines a variable (a task, in our example) as "preferred" if it participated in the previous solution and if its domain contains the value (worker) that was assigned to the variable in the previous solution, before the conditions of the problem changed. As long as there are preferred variables that have not yet been assigned a value, the CSP solver chooses one of these preferred variables (typically by random choice) to instantiate in the first phase of each stage. The CSP solver instantiates this variable to its preferred value, i.e., the value that it had in the previous solution. Otherwise, when no preferred variables exist, another variable is chosen, and a random value is selected from the domain of the variable. The solution process then proceeds in the normal fashion. The inventors have found that prioritizing the variables and values in this way leads efficiently to solutions that resemble the previous solution and are close to optimal.

As the solution process proceeds, a variable may lose its preferred status, if its previous assignment is pruned out of its domain, and may regain preferred status when the process backtracks. Scanning all the variables at each stage to determine which ones are preferred is time-consuming and inefficient. As an alternative, it is possible to hold the preferred variables in an "undoable object," i.e., an object that stores its previous state and is able to restore the previous state when the process backtracks. An object of this sort that is large enough to hold all the preferred variables, however, may consume large amounts of memory, especially since data will be replicated, and storing the object at each stage may also be time-consuming.

To avoid these inefficiencies, some embodiments of the present invention provide a novel data structure for efficiently keeping track of and selecting preferred variables. In these embodiments, the variables are stored in a vector, which is divided into two partitions by a pointer. (For conceptual clarity and simplicity of explanation, the partitions are referred to hereinbelow as the "left side" and the "right side" of the vector, but these terms are arbitrary and have no substantive meaning in the context of the present invention.) The only undoable object, in the sense defined above, is the pointer itself (which consumes the smallest amount of memory possible for an undoable object), while the remainder of the vector is stateless.

To begin the solution process, the vector is initialized with the indices of the preferred variables, and the pointer is initialized to the right end of the vector (meaning that the right side of the vector is empty). At each stage of the process, the CSP solver selects variables, typically at random, from the left side of the vector until it finds a variable that is still preferred, as defined above. Each variable thus selected is swapped to a position to the right of the pointer, while the pointer is shifted one position to the left. (Specifically, the selected variable is swapped with the variable immediately to the left of the pointer, and then the pointer is moved one place to the left.) Upon finding a preferred variable, the CSP solver instantiates the variable and proceeds through the constraint propagation phase.

If it becomes necessary to backtrack, only the pointer must be undone, by shifting its position back to the right by one or more positions. This pointer shift returns one or more variables, including the most recently instantiated variable, back to the preferred group on the left side of the vector, but leaves the remaining variables that were previously found to be non-preferred on the right. Therefore, in choosing the next variable to instantiate, the CSP solver will not have to revisit the variables that were already found to be non-preferred. In this manner, the preferred variables are managed efficiently while using only one small undoable object.

As noted earlier, the embodiments that are described further hereinbelow relate to the use of constraint programming in resource management: allocation of resources to resource consumers. In a specific example, the resources comprise workers, while the resource consumers are tasks. As other examples, the resources may comprise housing units, while the consumers are residents; or the resources and consumers may be male and female participants in a matchmaking service. In further alternative embodiments, the principles of the present invention may be used in test generation and design verification, as well as in other applications of constraint programming that are listed above or are otherwise known in the art.

System Description

FIG. 1 is a schematic, pictorial illustration showing a system 20 for workforce management, in accordance with an embodiment of the present invention. System 20 matches workers 22 to tasks 24 (represented symbolically in the picture by the locations at which the tasks are to take place). System 20 typically comprises a general-purpose computer, which is programmed in software to carry out the functions that are described herein. The computer comprises a processor 26 and a memory 28, which holds the data structures and information that are used in performing these functions. The software may be downloaded to the processor in electronic form, over a network, for example, or it may alternatively be provided on tangible media, such as optical, magnetic or electronic memory media. Further alternatively, at least some of the functions of processor 26 may be carried out by dedicated electronic logic circuits.

System 20 defines the problem of matching workers 22 to tasks 24 as a CSP. Each worker 22 has certain skills and other characteristics, such as cost and home location. Each task 24 has certain requirements, such as skill set and start and completion times. In the CSP addressed by system 20, the tasks are represented as variables, the workers as values in the domains of the variables, and the task requirements as constraints. System solves the CSP in order to find an assignment of values to variables (i.e., as assignment of workers to tasks) that satisfies the constraints. Because it performs this CSP solving function, processor 26 is also referred to herein as a "CSP solver." The processor may run any suitable CSP solving algorithm for this purpose, with the addition of the novel methods and data structures for handling preferred variables and values that are described herein.

In the methods that are described hereinbelow, certain variables are regarded as "preferred," meaning that in the course of solving the CSP, processor 26 chooses to instantiate these variables first, in preference to other variables. The preference is dynamic, in the sense that the variables are preferred only as long as they possess a certain dynamic property. As explained above, a typical reason for such preference may be that the respective domains of the preferred variables contain the values that were respectively assigned to these preferred variables in a previous solution of the CSP, which now must be modified.

The methods and data structures that are described herein, however, may similarly be applied using other criteria for giving preference to certain variables. Generally speaking, the data structures in question are advantageous when the property considered for giving preference to certain variables (such as the property that the previous value of the variable is currently in its domain) is monotonic, meaning in the present case that if the property does not hold for the domain of a given variable, it will necessarily not hold if the domain is reduced to any subset. This characterization encompasses many natural properties. For example, suppose that each job defines the most appropriate salary range for that job, and that meeting this preference is the most important optimization criterion in the problem at hand. Then, a "preferred variable" would be a job for which there exists at least one value (i.e., one candidate worker) in its current domain whose salary is within the range for the job. All other jobs would then be non-preferred.

Method for CSP Solving

Figure 2:
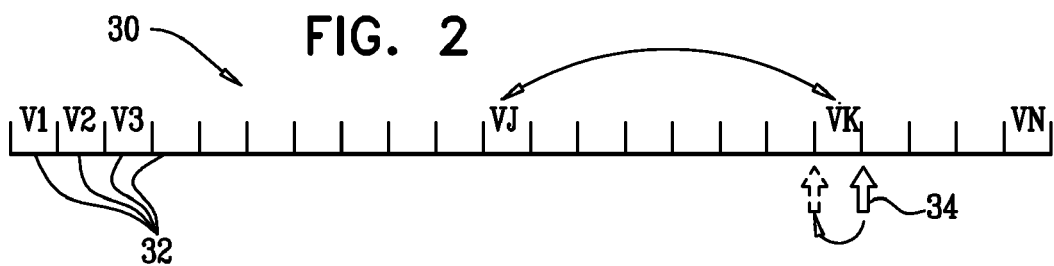
FIG. 2 is a schematic representation of a data structure used in solving a CSP, in accordance with an embodiment of the present invention.

FIG. 2 is schematic representation of a data structure 30, which is used in solving a CSP in accordance with an embodiment of the present invention. Data structure 30 has the form of a vector, with multiple slots 32. Typically, the number of slots is equal to the number of variables in the CSP in question, such as the number of tasks to which workers are to be assigned in the example of FIG. 1, or possibly to the number of variables that may have preferred status (if not all variables may be preferred). Each slot holds an index V1, V2, ..., VN corresponding to one of the variables. A pointer 34 separates the vector into left and right sides, which represent two partitions. The pointer may simply be represented as a number, indicating the slot at which the pointer is currently located. As noted earlier, this pointer is the only undoable object in the present method of solution, which thus makes only minimal use of expensive undoable resources.

Figure 3:
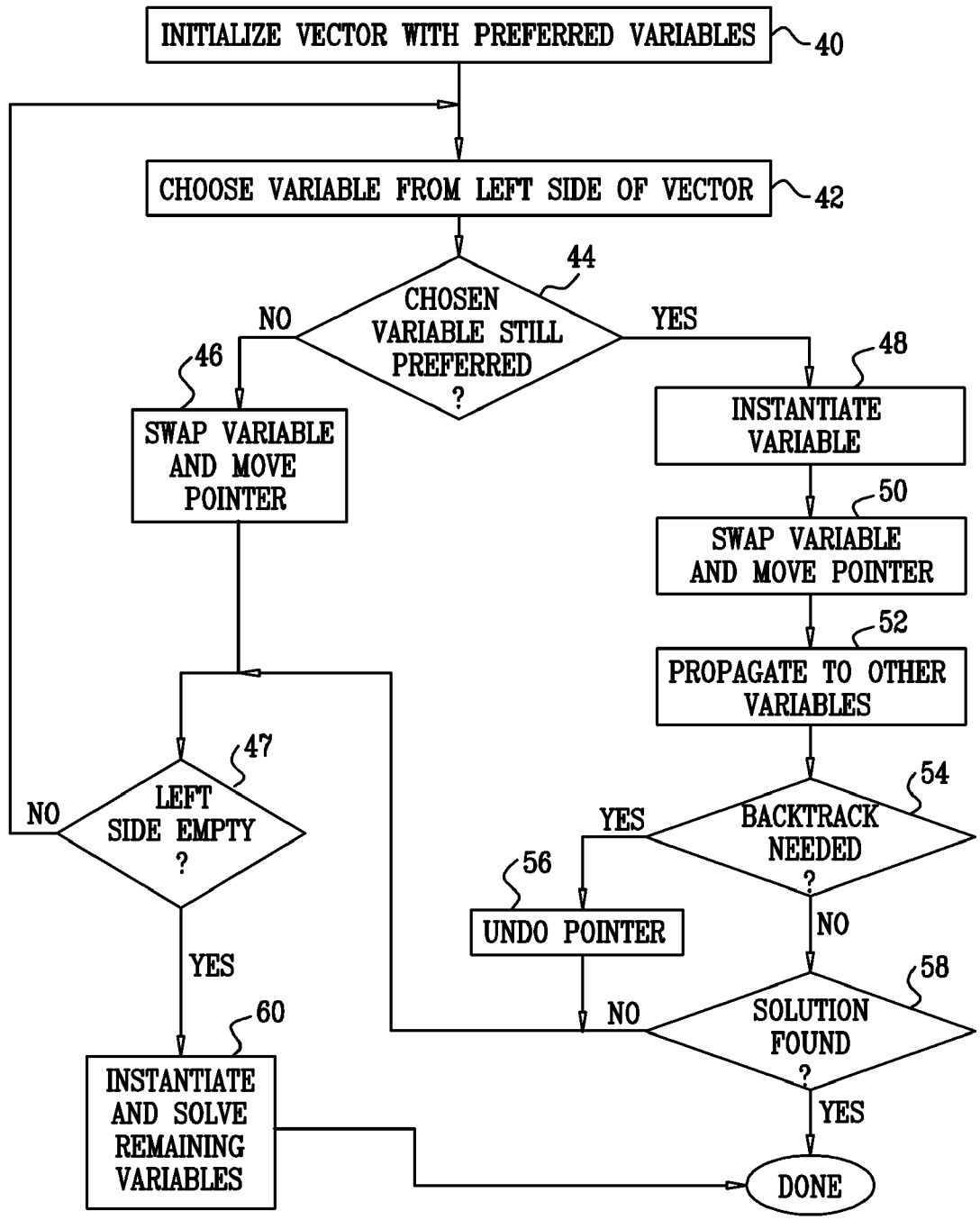
FIG. 3 is a flow chart that schematically illustrates a method for constraint programming, in accordance with an embodiment of the present invention.

FIG. 3 is a flow chart that schematically illustrates a method for solving a CSP, in accordance with an embodiment of the present invention. Data structure 30 (referred to hereinbelow simply as "the vector") is initialized with the indices of the preferred variables, at an initialization step 40. (In the specific example of workforce management that was noted above, the preferred variables may initially include all the tasks that were assigned respective workers in the previous assignment, and for which the respective workers are still available in the new assignment.) Pointer 34 is initialized to the right end of the vector, meaning that all of the variables are on the left side of the vector, and the right side is empty.

Processor 26 chooses one of the variables from the left side of the vector, at a variable selection step 42. Typically, the variable is chosen at random, although other selection criteria may alternatively be applied. The processor then checks the domain of the chosen variable to ascertain whether the variable is still preferred, at a preference checking step 44. The variable is considered to be preferred, as explained above, if its preferred value (the value that it was assigned in the previous solution of the CSP) is still in the domain of the variable. At the first pass through step 44, all of the variables in the vector will still be preferred, but in subsequent stages one or more of these variables may lose their preferred status if their preferred values were pruned out of their respective domains by constraint propagation in a previous stage.

If the variable chosen at step 42 is no longer preferred, processor 26 moves the variable to the right of pointer 34, at a non-preferred variable swapping step 46. In practice, as shown in FIG. 2, this step may be accomplished simply by swapping the chosen variable (VJ) with the variable currently to the left of the pointer (VK), and shifting the pointer one slot to the left. The processor then checks whether the left side of the vector is empty, i.e., whether the pointer has reached the leftmost slot, at a vector evaluation step 47. If not, the processor proceeds to choose another variable from the left side of the vector at step 42.

If the chosen variable is found at step 44 to be still preferred, the processor instantiates the variable to its preferred value, at an instantiation step 48. The processor moves the chosen variable to the right of pointer 34, at a preferred variable swapping step 50, in the manner described above with reference to step 46 and shown in FIG. 2. The processor then applies the appropriate constraint propagators to prune the domains of the remaining variables, at a constraint propagation step 52. This step uses techniques that are known in the art, and applies to both preferred and non-preferred variables.

It may occur in the course of constraint propagation that the domain of one or more of the variables becomes empty. In this case, the processor identifies the need to backtrack, at a backtracking step 54. Backtracking is accomplished by restoring the domains that the variables had at some earlier point in the search process, prior to the instantiation of at least the currently-selected preferred variable at step 48 and the consequent pruning that took place at step 52. Viewing the search process as a tree, as is common in the constraint solving art, it is possible to backtrack at step 54 to any given node in the tree that was visited previously. Pointer 34 is restored to the position it had (typically one or more slots to the right) when the given node in the search tree was last visited, at a pointer undoing step 56. Thus, after restoring the pointer, one or more variables may be returned to the preferred group that is available for instantiation, while other variables that were to the right of the pointer when the given node was last visited, which were removed previously from the preferred group, remain to the right of the pointer and need not be considered again at this stage.

After undoing the pointer at step 56, the processor verifies, at step 47, that the left side of the vector still contains other variables, and then returns to choose another variable at step 42.

When constraint propagation completes without backtracking at step 54, processor 26 examines the variable domains to determine whether a solution has been found, at a solution checking step 58. In CSP terms, as explained above, a solution means that respective values, satisfying the applicable constraints, have been assigned to all the variables. In specific terms of the workforce management example described above, a solution generally means that workers have been assigned to perform all the tasks. If so, the process terminates, and the processor returns the satisfying assignment.

Alternatively, if not all variables have yet been assigned a value, the processor continues to step 47, as explained above. At any pass through this step, if the left side of the vector is empty, and a solution has not yet been found, the processor may proceed to select and instantiate one of the remaining, non-preferred variables, at a default solution step 60. The method then proceeds by constraint propagation and instantiation of the other variables in the conventional manner, until a solution is found (or until it is found that no solution exists).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code stored in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for resource management, comprising:
a memory, which is configured to store a definition of a set of resource consumers, resources for allocation to the resource consumers, and constraints applying to the allocation of the resources; and
a processor, which is configured to associate respective variables with the resource consumers, and to identify the resources as values applicable to the variables, thereby defining respective domains of the values for the variables, and to identify a group of the variables as preferred variables, and which is operative to find an assignment of the values to the variables that satisfies the constraints by repeatedly performing, while the group contains one or more of the variables, the steps of choosing a variable from the group, instantiating the chosen variable with a value, removing the chosen variable from the group, and pruning the domains of the other variables by propagation of the constraints responsively to the value of the chosen variable, and to assign the resources to the resource consumers responsively to the assignment of the values to the variables,
wherein the variables in the group are represented by respective indices, and wherein the processor is configured to arrange the indices in respective slots of a vector, and to set a pointer to separate a first partition of the vector containing the preferred variables from a second partition of the vector, and to remove the chosen variable from the group by shifting the pointer by one slot into the first partition and moving a respective index of the chosen variable to a slot in the second partition that is adjacent to the pointer, and
wherein the processor is configured, upon choosing the variable, to verify that the chosen variable is still preferred, and when the chosen variable is no longer preferred, to shift the pointer by the one slot into the first partition and to move the respective index of the chosen variable to the slot in the second partition that is adjacent to the pointer without instantiation of the chosen variable.

2. The apparatus according to claim 1, wherein the resource consumers comprise tasks, and the resources comprises workers having respective skills, and wherein the processor is configured to assign the workers to perform the tasks responsively to the skills of the workers.

3. The apparatus according to claim 1, wherein the processor is configured to accept a first assignment of a respective first value to each of the variables, and to receive, after accepting the first assignment, an indication of a change in one or more conditions that mandates finding a second assignment, different from the first assignment, of the values to the variables, and to insert in the group those variables whose respective domains, following the change, contain the respective first value.

4. The apparatus according to claim 3, wherein the processor is configured to instantiate the chosen variable by assigning the respective first value to the chosen variable.

5. The apparatus according to claim 3, wherein the processor is configured to verify that the respective first value is contained in a domain of the chosen variable, and to remove the chosen variable from the group without instantiation when the first value is outside the domain.

6. The apparatus according to claim 1, wherein the processor is configured, upon determining that a domain of one of the variables has become empty due to pruning the domains in the course finding the assignment comprises, to backtrack in the propagation of the constraints and to return the chosen variable to the group.

7. Apparatus for resource management, comprising:
a memory, which is configured to store a definition of a set of resource consumers, resources for allocation to the resource consumers, and constraints applying to the allocation of the resources; and
a processor, which is configured to associate respective variables with the resource consumers, and to identify the resources as values applicable to the variables, thereby defining respective domains of the values for the variables, and to identify a group of the variables as preferred variables, and which is operative to find an assignment of the values to the variables that satisfies the constraints by repeatedly performing, while the group contains one or more of the variables, the steps of choosing a variable from the group, instantiating the chosen variable with a value, removing the chosen variable from the group, and pruning the domains of the other variables by propagation of the constraints responsively to the value of the chosen variable, and to assign the resources to the resource consumers responsively to the assignment of the values to the variables,
wherein the variables in the group are represented by respective indices, and wherein the processor is configured to arrange the indices in respective slots of a vector, and to set a pointer to separate a first partition of the vector containing the preferred variables from a second partition of the vector, and to remove the chosen variable from the group by shifting the pointer by one slot into the first partition and moving a respective index of the chosen variable to a slot in the second partition that is adjacent to the pointer, and
wherein the processor is configured, upon determining that a domain of one of the variables has become empty due to pruning the domains, to backtrack in the propagation of the constraints and to shift the pointer by at least the one slot into the second partition, thereby restoring to the group at least the variable that was chosen most recently.

* * * * *